United States Patent [19]

Davison et al.

[11] 4,026,453

[45] May 31, 1977

[54] VARIABLE WORK STATION FOR PNEUMATIC STAPLING APPARATUS

[75] Inventors: Martin Davison; Clement G. Gathwright, both of Baltimore, Md.

[73] Assignee: Western Coat Pad Company, Baltimore, Md.

[22] Filed: Mar. 31, 1976

[21] Appl. No.: 672,207

[52] U.S. Cl. .............................. 227/109; 227/119; 227/130; 227/154; 227/156

[51] Int. Cl.² ........................................ B27F 7/02

[58] Field of Search .......... 227/109, 110, 119, 130, 227/140, 154, 155, 156

[56] References Cited

UNITED STATES PATENTS

| 1,153,827 | 9/1915 | Reynolds | 227/109 |
| 3,436,004 | 4/1969 | Morabito et al. | 227/130 |
| 3,510,044 | 5/1970 | Weidenfeld et al. | 227/140 |

Primary Examiner—Granville Y. Custer, Jr.
Attorney, Agent, or Firm—Walter G. Finch

[57] ABSTRACT

The invention provides a variable work station for staple basting fabric materials, the invention comprising a work table having displaceable block-like sections which are interchangeable with block-like support members each mounting a stapling gun thereon. The support members are positioned in the spaces from which the block-like sections are removed in order to position the stapling guns in a desired location relative to the fabric work piece. The invention allows selective lateral positioning of the stapling guns over the work surface of the work station as well as allowing forward, backward, and pivotal movement of the stapling guns.

6 Claims, 7 Drawing Figures

VARIABLE WORK STATION FOR PNEUMATIC STAPLING APPARATUS

BACKGROUND AND SUMMARY OF THE INVENTION

Prior practices in the garment and fabric working industries have involved basting of two portions of a fabric material together by means of staples formed of a fine, soft material. The staples are usually applied by pneumatic stapling guns which are mounted on a work surface in a fashion which allows only a restricted degree of movement of the guns. Such prior art stapling guns are typically mounted such that only movement toward and away from an operator of the guns has been permitted. Thus, variation in the size and design of the work piece which could be staple basted at a given work station has been severely limited. Generally, prior art staple basting guns have been useful for only one operation without substantial structural modification to the work table on which the guns are mounted.

The present invention provides a variable work station for use with stapling guns of conventional design. According to the present invention, the stapling guns are mountable on the work surface of the present work station in a fashion which allows lateral displacement of the guns over the surface thereof, i.e., displacement within the lateral field of view relative to the operator. Further, the present invention retains the ability to displace the stapling guns toward and away from an operator thereof. The stapling guns can also be pivoted about their mountings according to the present invention to provide additional versatility. The different degrees of freedom provided to the stapling guns by the mounting mechanisms comprising the present work station provides a versatility which allows multiple basting operations of virtually any type to be performed with only one work station having multiple stapling guns mounted thereon.

In essence, the present work station comprises a work table having a plurality of removable blocks forming at least a portion of the work surface area of the table. The blocks are each removable and replaceable with mount members which each mount a stapling gun thereon. Thus, the stapling guns can be selectively located over the surface of the work table at those locations where the removable blocks are positioned. Thus, stapling operations can occur over the full area occupied by the blocks by removal of the block and replacement thereof with the staple guns. The work table can then be easily and rapidly arranged in a desired manner to fit the dimensions of a work piece on which basting operations are to be performed.

It is therefore an oject of the invention to provide a variable work station having a work surface mounting stapling guns thereon at selected locations on the work surface.

It is a further object of the invention to provide a variable work station mounting stapling guns on a work surface thereof whereby the guns can be positioned laterally relative to an operator as well as toward and away from the operator.

It is also an object of the invention to provide means for selectively controlling the operation of the stapling guns on the present work station.

Further objects and advantages of the invention will become more readily apparent in light of the following detailed description of the preferred embodiments of the invention.

DESCRIPTION OF THE PREFERRED EMBODIMENTS

Figure 1:
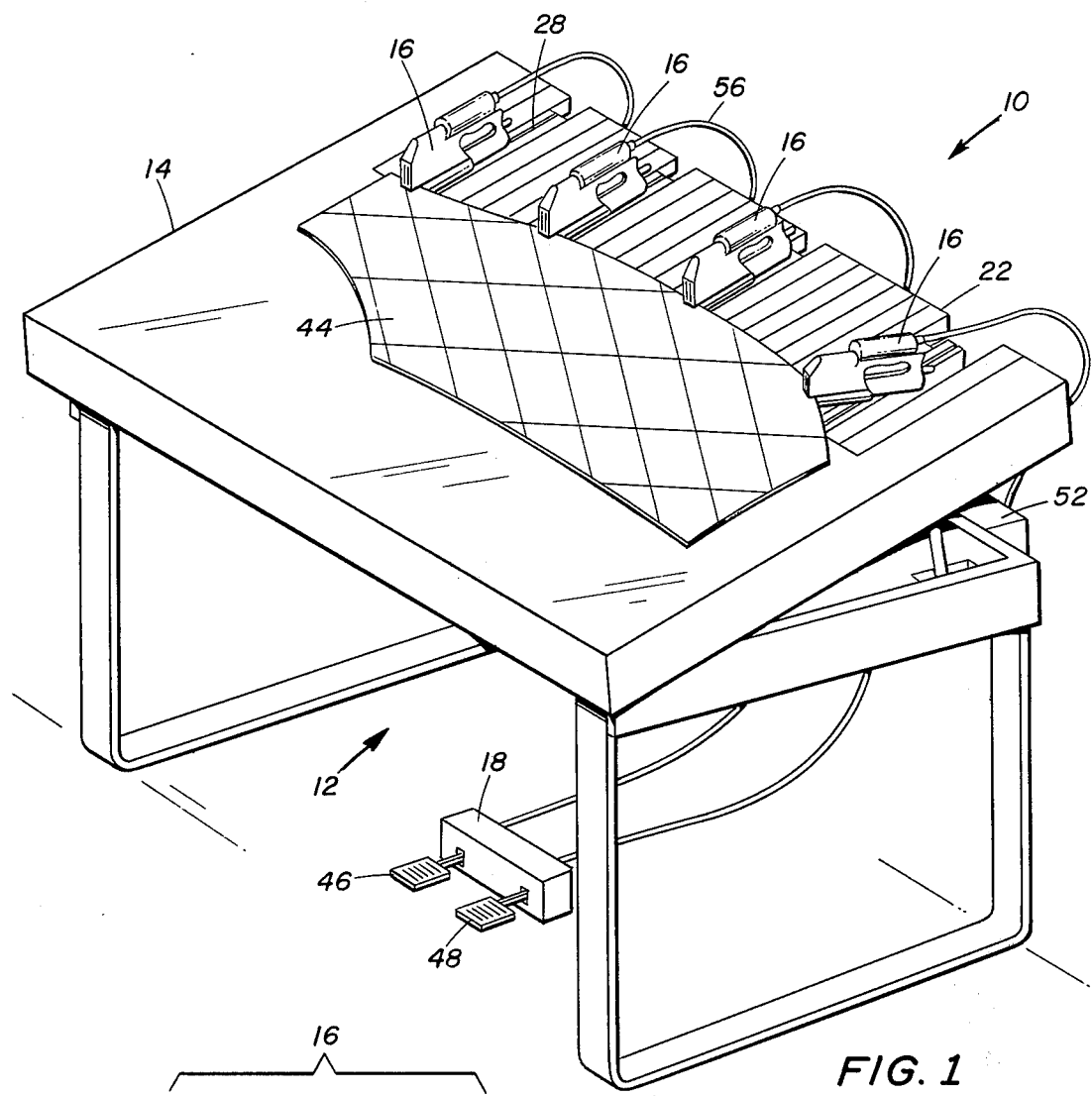
FIG. 1 is a perspective of the present variable work station illustrating the general structure of the work table comprising said work station.
Figure 6:
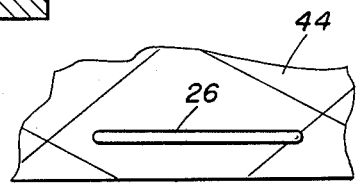
FIG. 6 is a plan view of a staple holding two portions of a work piece together; and, FIG. 7 is a side elevation of the staple and work piece of FIG. 6.
Figure 7:
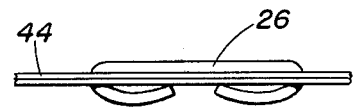

Referring to FIG. 1, the present variable work station is seen at 10 to comprise a work table 12 having lateral leg supports which mount at work surface 14 either horizontally or, as shown in the drawing, at a variable angle as can be seen in FIG. 1 and as will be described in detail hereinafter, that portion of the work surface 14 on which pieces of material 44 are to be stapled together is comprised of a plurality of removable rectangular blocks 22 laid into the top of the table 12, top level portions of the blocks 22 being flushed with each other and with the surface of the remaining portions of the top of the table 12 to form the work surface 14. The blocks 22 preferably comprise the upper central portion of the work surface 14 which lies along the upper edge of the surface 14 and extends over a rectangular portion of said surface 14. A plurality of stapling guns 16 are mounted one each on support members 28 which are each selectively positioned in a space in the table 12 from which one of the blocks 22 has been removed. Thus, the stapling guns 16 can be selectively spaced over the full area of the work surface 14 formed by the removable blocks 22. The stapling guns 16 are pneumatically operated by foot pedals 46 and 48 as will be described in detail hereinafter. The stapling guns 16 per se are known in the art. The guns 16 apply staples, such as is shown at 26 in FIGS. 6 and 7, to hold two pieces of material 44 together. By removing selected ones of the blocks 22, the stapling guns 16 (held on the support members 28) can be laterally positioned as desired along that portion of the work surface 14 defined by the blocks 22. The work station 10 is thereby useful with garments and fabriclike materials of differing dimensions, which require differing basting operations.

Figure 3:
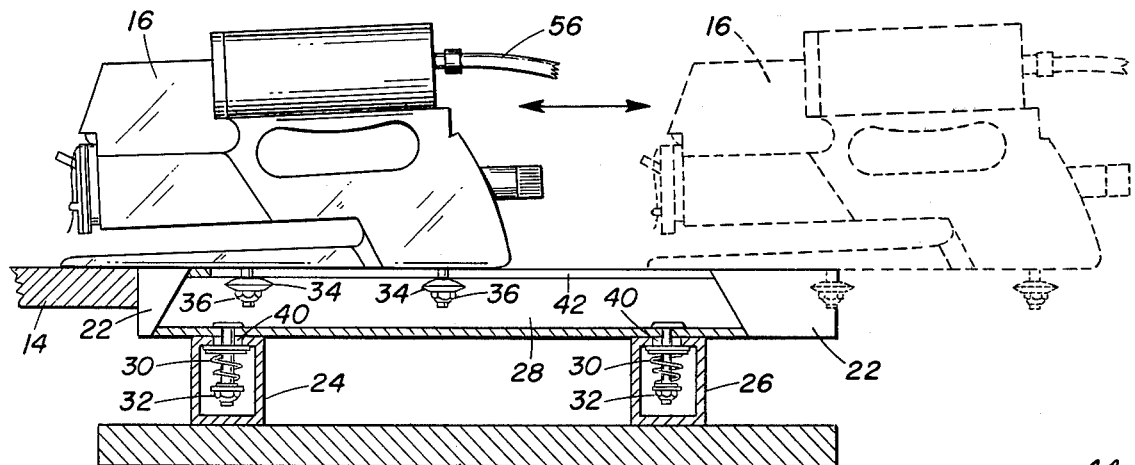
FIG. 3 is an elevation in partial section of the structure shown in FIG. 2.
Figure 4:
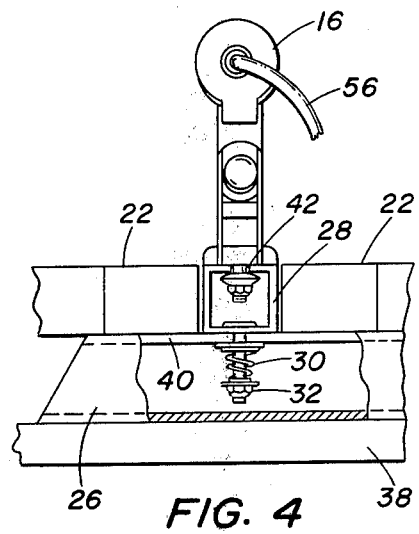
FIG. 4 is a detail end view of a portion of the structure of FIG. 2.
Figure 2:
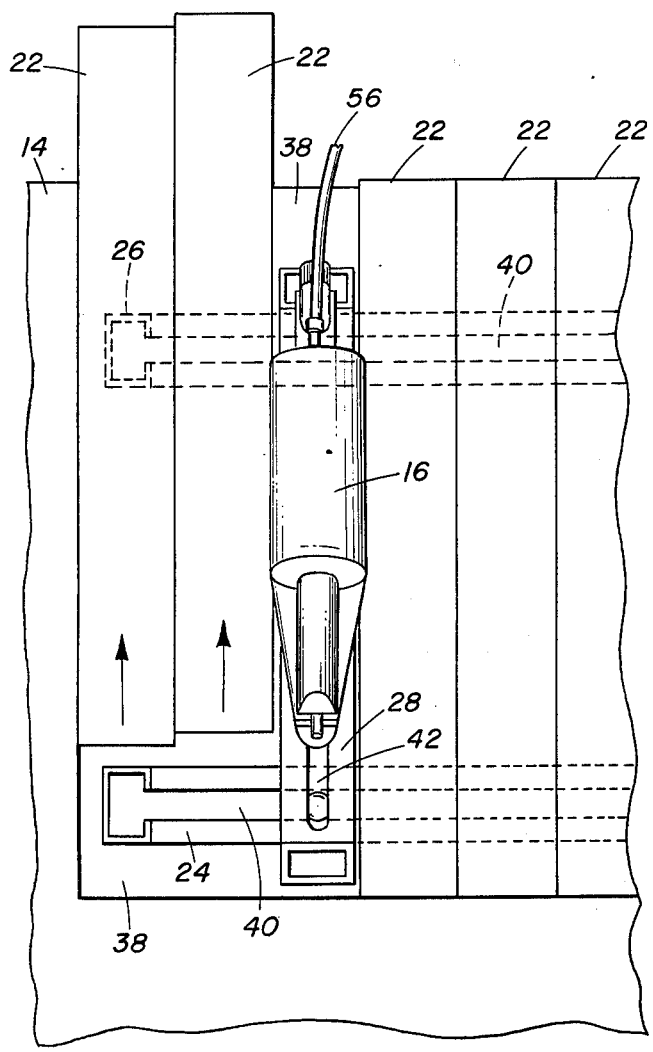
FIG. 2 is a plan view of one of the stapling devices and the associated removable blocks which comprise a portion of the surface of the work table.

Referring now to FIGS. 2, 3, and 4, the blocks 22 are seen to be supported by front and rear channels 24 and 26 respectively which each have longitudinal slots 40 formed axially therein. The slotted channels 24 and 26 are supported by a board 38 which forms a subsurface of the work surface 14. The blocks 22 are disposed transversely relative to the channels 24 and 26, As seen particularly in FIG. 2, the blocks 22 slide relative to the channels 24 and 26 and can thereby be individually removed from the table 12. The blocks 22 rest in place by gravity on the channels 24 and 26. There is no connection of blocks 22 to the channels 24 and 26. Not being attached in any way to the channels 24 and 26, they are removed as necessary by simply sliding them out of the assembly as indicated by the arrows in FIG. 2. One of the blocks 22 is removed from a space where it is desired to locate one of the stapling guns 16. As mentioned previously, each stapling gun 16 is mounted on a support member 28 which has a dimension in width similar to those of one of the blocks 22. The length of support member 28, however, is less than block 22. This difference in length can be seen in FIG. 3 where the support member 28 is shown in cross section with tapered ends, and block 22 is shown in full length in position in back of support member 28. Thus, the support member 28 fits into the space vacated by the block 22. The support member 28 has a longitudinal slot 42 formed in its upper face for receiving bolt assemblies 36 which extend from the stapling gun 16. A cupped washer 34 on each of the bolt assemblies 36 is held within the slotted support member 28 to mount the gun 16 to said member 28.

The support member 28 has spaced bolt and washer assemblies 32 which are assembled into the open end portions of channels 24 and 26, the bolt portion of the assemblies 32 extending through the slots 40 in the channels 24 and 26, and are slid within the channels 24 and 26 to move into the position selected for using the stapling gun 16 mounted thereon. A spring 30 on each of the assemblies 32 acts to retain the support member 28 in the selected place on the channels 24 and 26. Thus, the support members 28 mounting the stapling guns 16 are movable axially of the channels 24 and 26 in a sense that is laterally relative to a user of the work station 10. Further, the stapling guns 16 are movable axially of the support members 28 with a degree of freedom determined by the slot 42, movement of the guns 16 being in a sense that is toward or away from a user at the work station 10. The stapling guns 16 may also be turned at a skew angle relative to the channels 24 and 26 by taking advantage of the clearances in the assembly. A greater skew angle can be obtained by sloting one of the holes in support member 28 where the bolt of assembly 32 passes through it.

Figure 5:
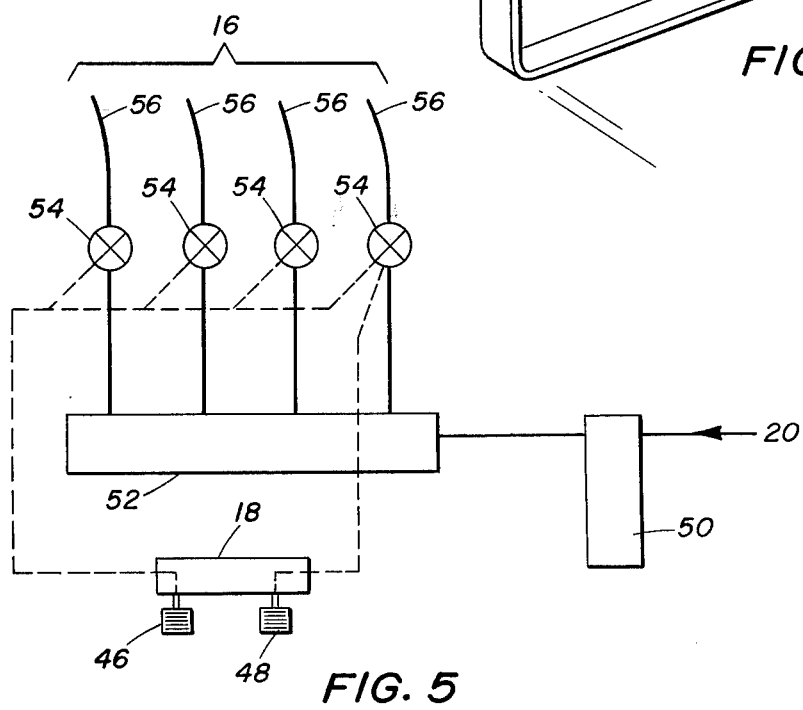
FIG. 5 is a schematic of the control system utilized to operate the invention.

Each stapling gun 16 is operated pneumatically through air hoses 56 which are fed by a regulated pressurized air supply 20 in a manner particularly shown in FIG. 5. Pressurized air from the supply 20 is filtered at 50 prior to entering a manifold 52. The manifold 52 feeds the air hoses 56 through actuating control valves 54, each one of the hoses 56 having the pressurized air flow therethrough controlled by one of the control valves 54. Mechanical connections to the control valves 54 can be selectively varied such that operation of the foot pedal 48 causes a preselected control valve 54 to open, thereby operating the mechanism of stapling gun 16 which is connected to the air hose 56 in which the preselected control valve 54 is disposed. Operation of the foot pedal 46 causes all of the control valves 54 to open, thereby operating the mechanisms of all of the guns 16.

It should also be pointed out that the blocks 22 adjacent and spaced from each of the support members 28 act to support the material 44 while said material is being staple basted together. Without the support provided by the blocks 22, the material 44 will sag and be unevenly basted.

It is believed obvious that the invention can be configured other than as described above without departing from the scope of the invention as defined by the appended claims.

What is claimed is:

1. A variable work station for staple basting pieces of material together utilizing stapling guns mounted on said work station, the work station comprising:
    a planar work surface having a portion thereof cut away over at least one perimetric edge thereof to define a recess;
    a plurality of block members having upper planar surfaces adapted to removably fit into the recess in said work surface;
    means for supporting the block members in the recess, said support means holding the block members at a disposition relative to the work surface such that said upper planar faces of said block members are co-planar with the work surface and define a portion thereof;
    at least one support member mounting one of the stapling guns, the support member being insertable into a space provided by removal of one of the block members from the recess, the mounting surface of the stapling gun being co-planar with the work surface; and,
    means for actuating the stapling gun to staple baste the pieces of material together.

2. The work station of claim 1 wherein the supporting means comprise:
    front and rear channels disposed beneath the plane of the work surface and having longitudinal slots formed therein, the channels extending transversely to the block members; and,
    connection means mounted on lower portions of the support member and being slidably received within the slots in the channels, the support member and the stapling gun mounted thereby being movable along the length of the channels.

3. The work station of claim 2 wherein the support member has a longitudinal slot in the upper face thereof and wherein the stapling gun has slot following means mounted on the underside thereof and being slidably received within the slot in the support member, the stapling gun thereby being movable along the length of said slot in said support member.

4. The work station of claim 1 wherein a plurality of said support members each mounting one of the stapling guns are disposed within the spaces provided by the removal of a plurality of said block members.

5. The work station of claim 4 wherein the actuating means comprise:
    pressurized gas storage means;
    manifold means connected to the pressurized gas storage means;
    gas hose means connected to the manifold means;
    control valve means in each one of the gas hose means; and,
    means for selectively actuating the control valve means to supply pressurized gas to any one or all of the stapling guns thereby to operate said guns.

6. The work station of claim 5 wherein the last-mentioned means comprise:
    a first foot pedal connected to a selected one of said control valve means, operation of the foot pedal opening said selected control valve means; and,
    a second foot pedal connected to all of the control valve means, operation of the second foot pedal opening all of the control valve means.

* * * * *